(12) United States Patent  (10) Patent No.: US 6,264,787 B1
Burbank  (45) Date of Patent: Jul. 24, 2001

(54) APPARATUS FOR FABRICATING A TAPER ON A RECORDING HEAD SLIDER

(75) Inventor: Daniel Paul Burbank, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/231,138

(22) Filed: Jan. 15, 1999

Related U.S. Application Data

(62) Division of application No. 08/893,352, filed on Jul. 16, 1997, now Pat. No. 5,925,261.
(60) Provisional application No. 60/047,325, filed on May 21, 1997.

(51) Int. Cl.$^7$ ............................................ C23F 1/02
(52) U.S. Cl. ................................. 156/345; 204/298.36
(58) Field of Search .................. 156/345; 204/298.36, 204/192.34; 438/713, 712; 216/65, 66

(56) References Cited

U.S. PATENT DOCUMENTS

| | | | |
|---|---|---|---|
| 5,350,499 | * 9/1994 | Shibaike et al. | 204/192.34 |
| 5,567,333 | 10/1996 | Hira et al. | 216/22 |
| 5,868,952 | * 2/1999 | Hatakeyama et al. | 156/345 |
| 5,910,864 | * 6/1999 | Hira et al. | 360/103 |

* cited by examiner

*Primary Examiner*—Thi Dang
(74) *Attorney, Agent, or Firm*—Westman, Champlin & Kelly, P.A.

(57) ABSTRACT

A method of forming a leading edge taper in a selected area on the bearing surface of a disc head slider includes directing an etching beam toward the bearing surface, with a first portion of the selected area being shaded from the etching beam and a second portion of the selected area being unshaded from the etching beam. The areas of the first and second portions are varied over time to form the taper.

7 Claims, 4 Drawing Sheets

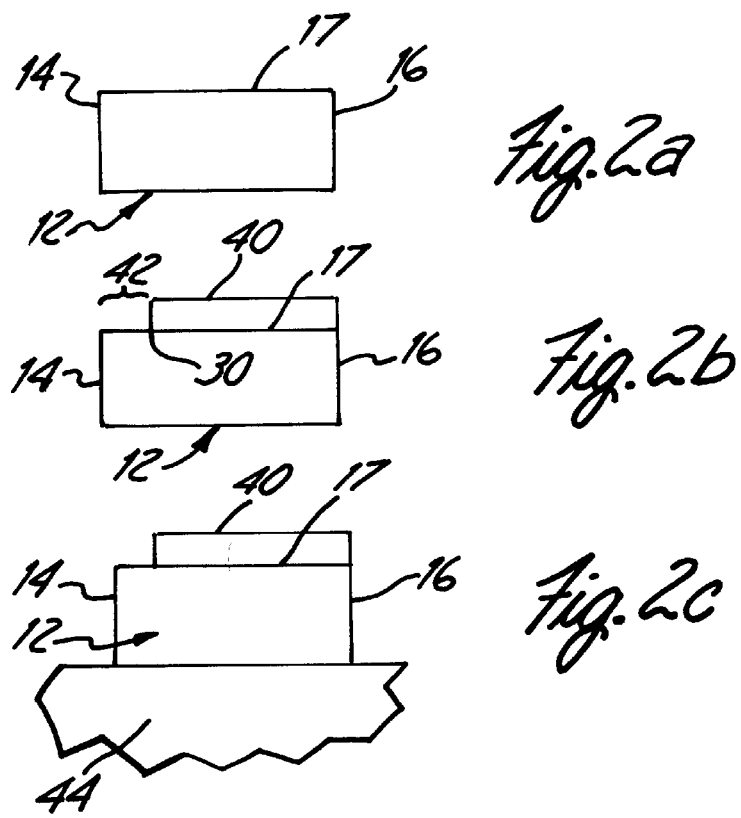
Fig. 2a
Fig. 2b
Fig. 2c
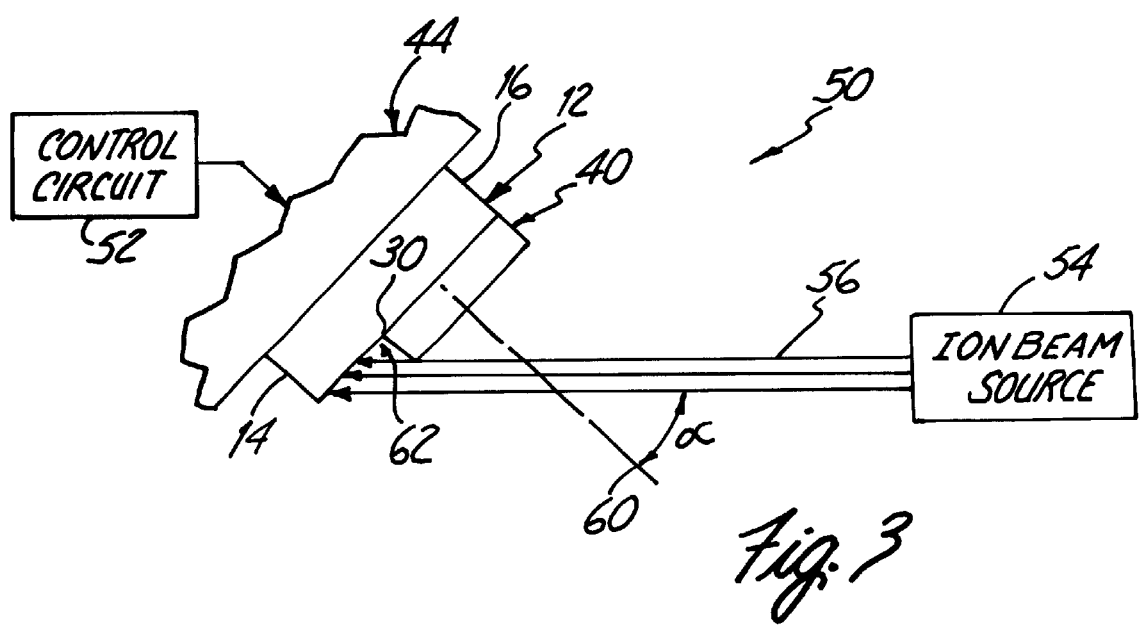
Fig. 3

APPARATUS FOR FABRICATING A TAPER ON A RECORDING HEAD SLIDER

CROSS REFERENCE TO RELATED APPLICATION

This application is a divisional and claims the benefit of U.S. application Ser. No. 08/893,352 which was filed on filed Jul. 16, 1997, now U.S. Pat. No. 5,925,261, is entitled METHOD FOR FABRICATING A TAPER ON A RECORDING HEAD SLIDER, and claims a priority from U.S. Provisional Application Ser. No. 60/047,325, which was filed on May 21, 1997 and is entitled METHOD FOR MAKING RECORDING HEAD SLIDER AIR BEARING LEADING EDGE TAPERS.

BACKGROUND OF THE INVENTION

The present invention relates to disc drive data storage systems and, more particularly, to a method of fabricating a leading edge taper on a recording head slider.

Disc drives of the "Winchester" type are well known in the industry. Such drives use rigid discs which are coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces.

An actuator mechanism moves the sliders from track to track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes an air bearing surface which faces the disc surface. As the disc rotates, the disc drags air under the slider and along the air bearing surface in a direction approximately parallel to the tangential velocity of the disc. As the air passes beneath the air bearing surface, air compression along the air flow path causes the air pressure between the disc and the air bearing surface to increase which creates a hydrodynamic lifting force that counteracts the load force and causes the slider to lift and fly above the disc surface. This process is known as slider "take-off".

A conventional air bearing surface includes a pair of raised side rails which face the disc surface. A taper is formed at the leading edges of the side rails, which acts as an aerodynamic ram for laminar flow generated by the rotating disc. An example of a leading edge taper is disclosed in Warner et al. U.S. Pat. No. 4,475,135. The taper is typically formed during an air bearing surface grinding and lapping process by tilting the slider, or a group of sliders, so that the leading edge of the slider is eroded with respect to the remaining air bearing surface and formed into the intended aerodynamic ram configuration. Since the air bearing surface is pressurized by the leading edge taper, variation in the taper angle and the position of the taper relative to other air bearing surface features causes the flying height of the transducer to vary. In addition, the flying height of the transducer typically varies proportionately more with variations in the manufacture of the taper than with other manufacturing variations.

There are three major difficulties associated with the conventional method of forming the leading edge taper. First, the angle of the taper with respect to the air bearing surface can be controlled only to the degree afforded by the mechanical tilting mechanism. Imprecision of the tilting mechanism introduces the greatest error in the intended angle at very shallow taper angles.

Second, the length of the taper and its position with respect to other air bearing surface features varies with the uncertainty in the grinding or lapping rate and with the tilt angle. The intersection between the leading taper and the air bearing surface has the greatest variability in location relative to other air bearing surface features, at shallow taper angles.

Third, conventional grinding or lapping processes permit only linear leading edge tapers. Also, the intersection between the taper and the air bearing surface is limited to a line which is parallel to the trailing edge of the slider. In addition, the surface of the lap plate limits the geometry of the taper area to a nearly planar surface since the taper area conforms to the surface of the lap plate. This also causes the taper area to be nearly perpendicular to the average laminar airflow direction.

The geometry of the leading taper, side rails and other air bearing surface features are designed to precisely control the flying height of the transducer over the rotating disc and to minimize friction between the slider and the disc. Limitations in the manufacturing control of very shallow taper angles eliminates from practical consideration air bearing configurations which provide superior control of the flying height. As a result, there is a continuing need for improved fabrication processes for forming leading edge tapers.

SUMMARY OF THE INVENTION

The method of the present invention for of forming a taper in a selected area on the bearing surface of a disc head slider includes directing an etching beam toward the bearing surface. A first portion of the selected area is shaded from the etching beam and a second portion of the selected area is unshaded from the etching beam. The areas of the first and second portions are varied over time while the second portion is etched to create a smooth depth profile for the taper.

In one embodiment, the method further includes applying a resist layer to the bearing surface in a pattern which leaves the selected area uncovered. The etching beam is directed toward the selected area at an angle $\alpha$ relative to a normal incidence with the bearing surface such that the first portion is shaded from the etching beam by the resist layer and the second portion is unshaded by the resist layer. The areas of the first and second portions are varied during the step of etching by varying the angle $\alpha$. For example, the angle $\alpha$ is reduced incrementally over time. The incremental reduction in the angle a results in a smooth depth profile along the selected area.

BRIEF DESCRIPTION OF THE DRAWINGS

FIGS. 2a–2c are side plan views of a slider substrate at various stages of the fabrication process of the present invention.

FIG. 3 is a diagram of a directed beam etching system according to one embodiment of the present invention.

DETAILED DESCRIPTION OF THE PREFERRED EMBODIMENTS

Figure 1:
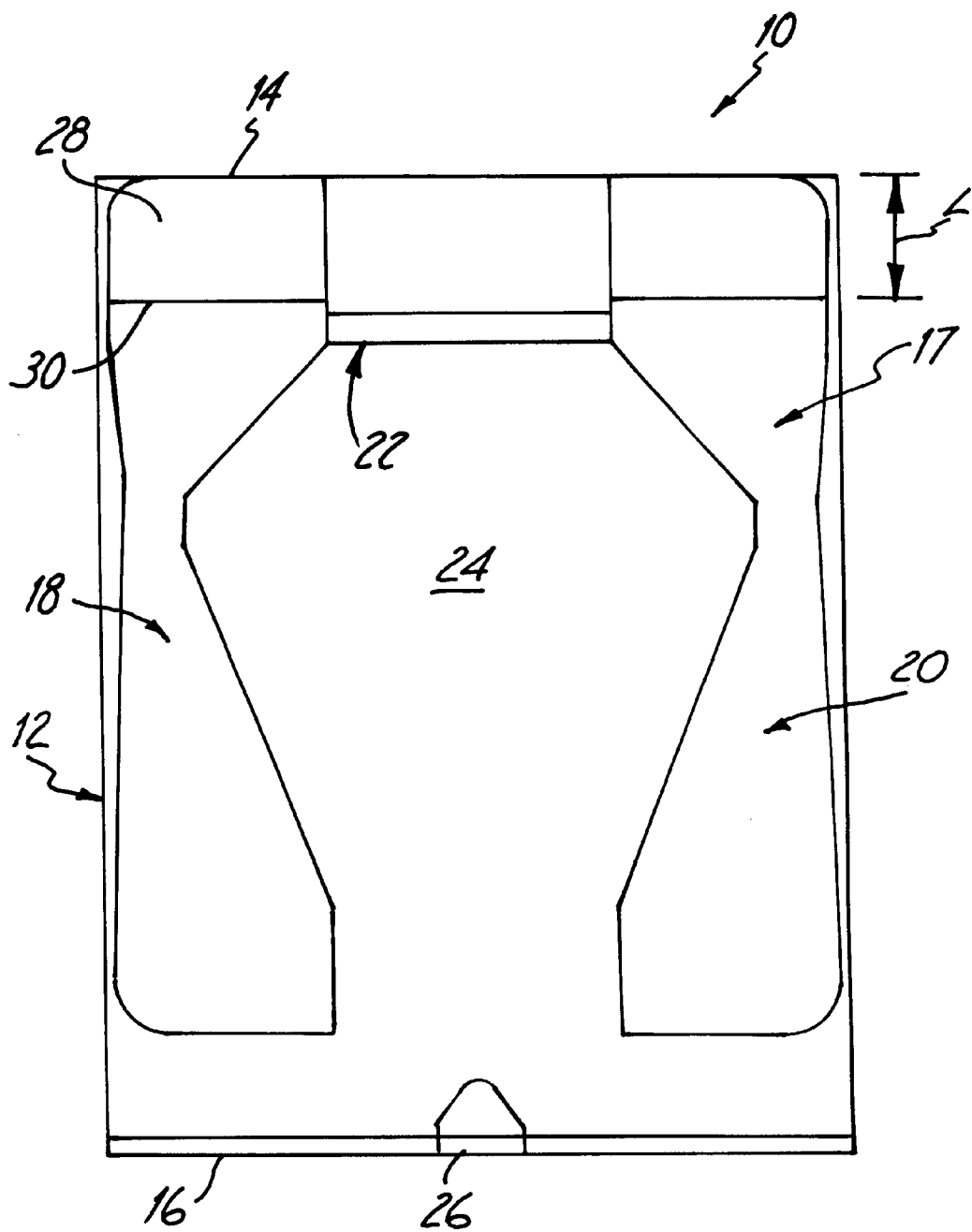
FIG. 1 is a plan view of a hydrodynamic bearing slider having a leading edge taper formed by a directed beam etching process in accordance with the present invention.

FIG. 1 is a plan view of a hydrodynamic bearing slider having a leading edge taper formed by a directed beam etching process in accordance with the present invention. Slider 10 includes substrate 12 (e.g. ceramic), leading edge 14, trailing edge 16 and air bearing surface 17. Air bearing surface 17 includes raised side rails 18 and 20, cross rail 22, subambient pressure cavity 24 and raised center pad 26. Raised center pad 26 carries a transducer (not shown) at trailing edge 16 for reading information from and writing information to a recording media, such as a rotating magnetic disc. The geometry of the air bearing surface features are tightly controlled to control the flying characteristics of the slider.

Leading taper 28 is formed at the leading edges of side rails 18 and 20 and cross rail 22, which acts as an aerodynamic ram for laminar airflow generated by the rotating magnetic disc. Leading taper 28 has a length L which extends from leading edge 14 to an intersection 30 with the air bearing surfaces formed by side rails 18 and 20. Leading taper 28 is formed on substrate 12 after an initial air bearing surface grinding and lapping stage and prior to the formation of the air bearing surface features.

FIG. 2a is a side plan view of slider substrate 12 after the grinding and lapping stage. Air bearing surface 17 has been lapped flat according to conventional lapping techniques. Next, a thick resist layer 40 is applied to air bearing surface 17 using a conventional lithographic technique, as shown in FIG. 2b. Resist layer 40 can include a dry film resist layer, for example. Resist layer 40 has a pattern in which a selected area 42 on air bearing surface 17 remains uncovered. Area 42 corresponds to the location of leading taper 28 (shown in FIG. 1). The base of resist layer 40 adjacent to area 42 defines the location of intersection 30 along the length of substrate 12, between leading taper 28 and the final air bearing surface.

Once resist layer 40 has been applied to slider substrate 12, slider substrate 12 is attached to a carrier fixture 44, as shown in FIG. 2c. Fixture 44 provides convenience of handling and heat seek sinking during subsequent etching processes. Slider substrate 12 can be attached to fixture 44 either separately or with a plurality of other slider substrates. Fixture 44 with attached slider substrate 12 is then mounted within a directed beam etching system, such as an ion mill.

FIG. 3 is a diagram of an ion mill etching system 50 according to one embodiment of the present invention. Etching system 50 includes fixture orientation control circuit 52 and ion beam source 54. Fixture 44 is mounted within etching system 10 such that resist layer 40 and exposed area 42 on bearing surface 17 face ion beam source 54. Ion beam source 54 directs a highly collimated ion milling beam 56 toward area 42. Ion beam source 54 can include a reactive or non-reactive ion beam source. In addition, other directed beam anisotropic etching systems can also be used with the present invention.

Fixture 44 is mounted within etching system 50 such that ion beam 56 has an angle of incidence α on bearing surface 17 with respect to a normal incidence 60. Since resist layer 40 is relatively thick, this orientation creates a relatively large mill shaded region 62 adjacent the base of resist layer 40. Control circuit 52 is mechanically coupled to fixture 44 for controlling the length of the mill shaded region 62 by controlling the beam angle α through the orientation of fixture 50. Control circuit 52 varies the beam angle α during the ion milling process according to a predetermined schedule. In one embodiment, the beam angle α is varied stepwise through the duration of the ion milling process to create a smooth depth profile along the length of area 42. Control circuit 52 can be constructed to perform an open-loop or a closed-loop control function, as desired. The control algorithm for control circuit 52 can be stored in a memory associated with the control circuit in a known manner.

Figure 4:
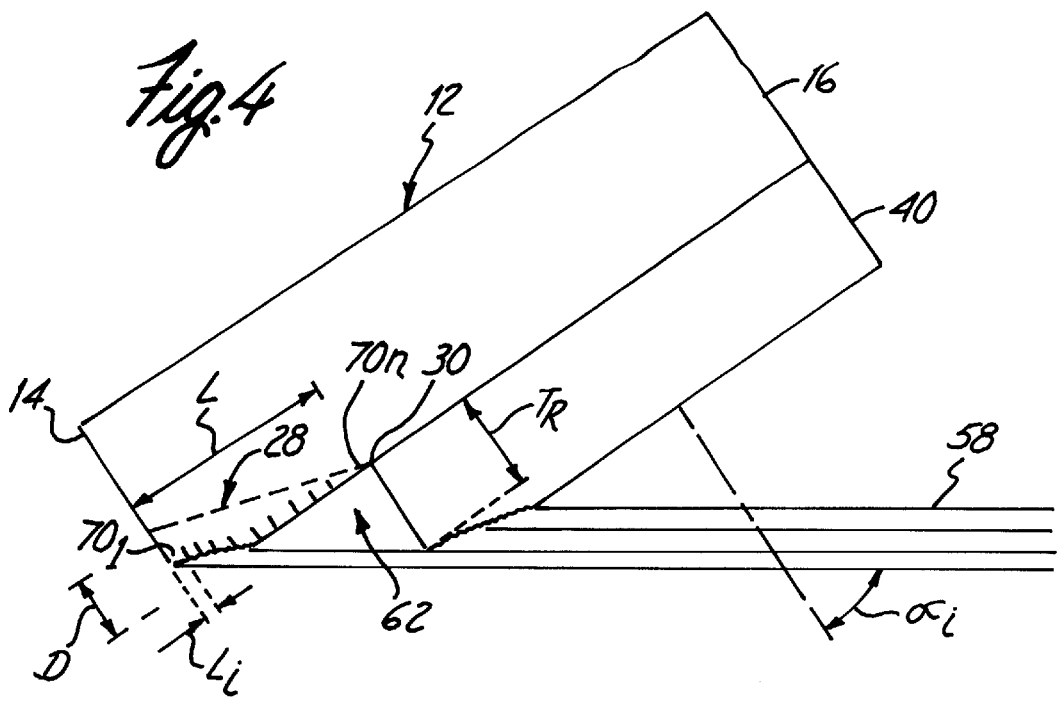
FIG. 4 is a side plan view of the slider substrate partially etched within the etching system shown in FIG. 3 according to a selected etching schedule.

FIG. 4 is a side plan view of substrate 12 which has been partially etched with a mill time versus mill angle schedule according to one embodiment of the present invention. The desired length L of leading taper 28 (shown in phantom) is divided into n segments $70_1 - 70_n$, where n is an integer greater than 1. Each segment $70_i$ has a length $L_i$, where i is an integer ranging from 1 to n. For each segment $70_i$, a fixture angle $α_i$ is calculated that results in resist layer 40 shadowing all segments $70_i - 70_n$ that are closer to resist layer 40 than segment $70_i$. The fixture angle α is calculated for each milling step i by the relationship:

$$α_i = \arctan (L_{i+1} \; L_{i+2} + \ldots + L_n)/T_R$$

where $T_R$ is the thickness of the remaining resist layer 40 during ion milling step i.

Leading taper 28 has a desired maximum depth To generate a linear taper, for example, the incremental depth $D_i$ milled during each milling step i is equal to the desired maximum depth D of taper 28 divided by the total number of steps n in the mill schedule. The time interval $t_i$ required to mill the desired incremental depth $D_i$ at each step i in the mill schedule is determined by:

$$= D_i R_i$$

where, $R_i$ is the milling rate at angle $α_i$.

EXAMPLE

A demonstration of this method was performed for a linear taper having a desired maximum taper depth D of 1.6 μm, to be obtained at a distance of 200μm and greater from the base of resist layer 40. The maximum taper depth D was divided into 11 steps. The incremental depth $D_i$ milled during each step was therefore 1.6 μm/11 = 0.1454 μm. Also, the 200 μm taper length was divided into eleven 20 μm segments, $70_1 - 70_{11}$. Table 1 shows the milling time intervals and milling angles used for the demonstration, as well assumptions about the etch rates as a function of the milling angle α. The etch rates were obtained from separate etch rate calculations.

TABLE 1

| Step | Dist. Milled Beyond LE Break (μm) | Angle α | Interval Ending Time (min.) | Approx Relative Etch Rate | Etch Rate | Mill Time for 16000/11 = 1454A removal |
|---|---|---|---|---|---|---|
| 1 | 200 | 76 | 11 | 0.4 | 130 | 11.18 |
| 2 | 180 | 74 | 22 | 0.4 | 130 | 11.18 |
| 3 | 160 | 73 | 31 | 0.5 | 162.5 | 8.95 |
| 4 | 140 | 70 | 39 | 0.6 | 195 | 7.46 |
| 5 | 120 | 67 | 45 | 0.7 | 227.5 | 6.39 |
| 6 | 100 | 63 | 50 | 0.9 | 292.5 | 4.97 |
| 7 | 80 | 58 | 55 | 0.9 | 292.5 | 4.97 |
| 8 | 60 | 50 | 60 | 1 | 325 | 4.47 |
| 9 | 40 | 39 | 65 | 0.8 | 260 | 5.59 |
| 10 | 20 | 22 | 74 | 0.5 | 162.5 | 8.95 |
| 11 | 0 | 0 | 83 | 0.5 | 162.5 | 8.95 |

During step 1, segments $70_2$–$70_{11}$ were shaded from the highly collimated ion milling beam 56 by selecting an angle α of 76°. Only segment $70_1$, at a distance greater than 200 μm from the base of resist layer 40, was exposed to ion milling. The deepest segment, segment $70_1$, was milled during steps 1 through 11 of the mill schedule. During step 2, segments $70_1$ and $70_2$ were exposed to ion milling by selecting an angle α of 74°. Segment $70_2$ was milled during steps 2 through 11. This pattern was repeated through segment $70_{11}$, which was milled only during the last step, step 11. A brief final mill step at 0° removed milled material that has redeposited on the bearing surface during earlier mill steps.

Figure 5:
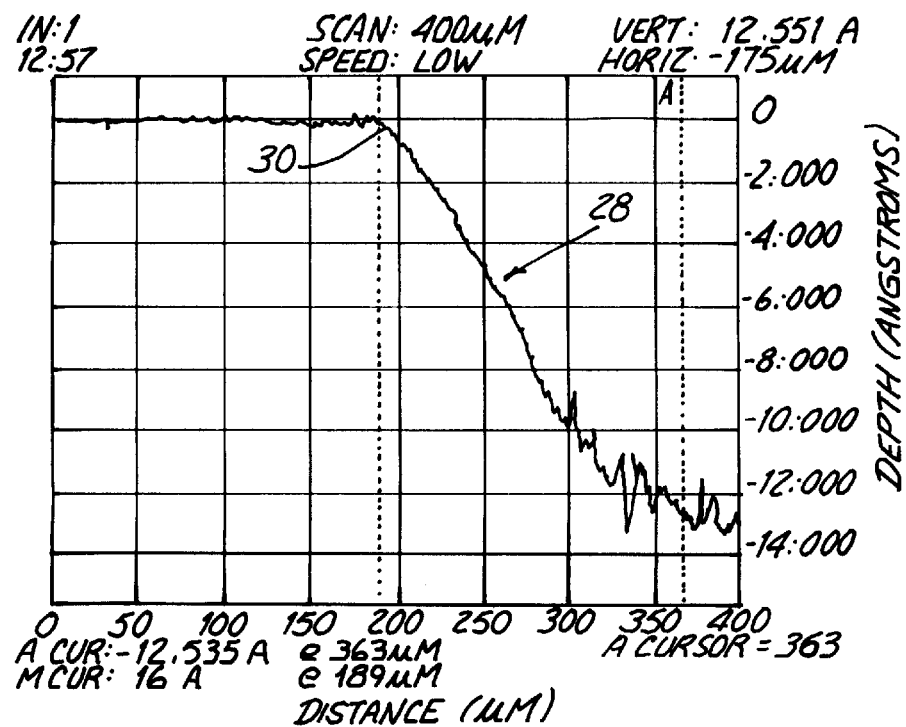
FIG. 5 is graph from a profilometer showing a leading edge taper milled into the bearing surface of the slider substrate.

Since ion beam 56 impinges on the bearing surface at a large angle, the incremental, "stairstep" mill depth is smoothed out completely over the milling schedule. FIG. 5 is graph from a profilometer showing leading edge taper 28 milled into the bearing surface of slider 10, beginning at intersection 30.

Figure 6:
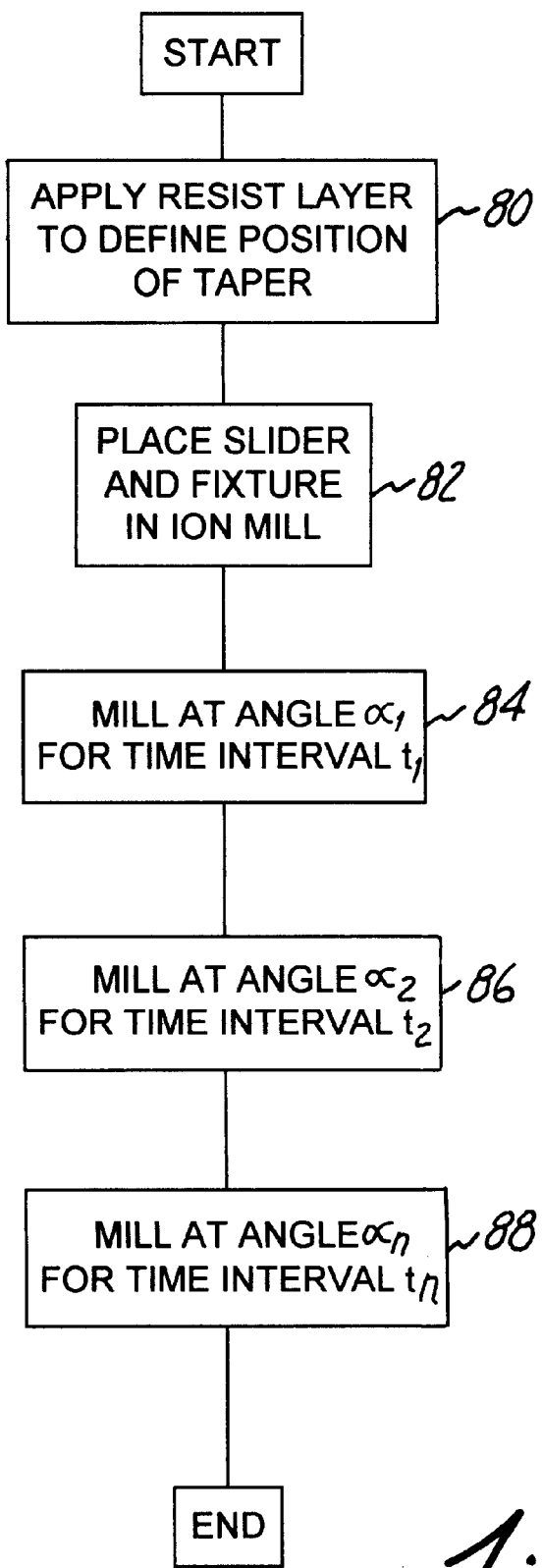
FIG. 6 is a flow chart illustrating a method of forming a leading edge taper according to one embodiment of the present invention.

FIG. 6 is a flow chart illustrating the method of forming a leading edge taper according to one embodiment of the present invention. At step 80, resist layer 40 is applied to slider substrate 12 to define the position of leading edge taper 28, as shown in FIG. 2b. At step 82, substrate 12 and fixture 44 are mounted in the ion mill, as shown in FIG. 3. At step 84, ion beam 56 mills the exposed portion of the bearing surface at an angle $α_1$, for a time interval $t_1$. At step 86, the milling angle is reduced to $α_2$ and ion beam 56 mils the exposed portion of the bearing surface for a time interval $t_2$. This process repeats through step 88, where the exposed portion of the bearing surface is milled at an angle $α_n$ for a time interval $t_n$.

Although the present invention has been described with reference to preferred embodiments, workers skilled in the art will recognize that changes may be made in form and detail without departing from the spirit and scope of the invention. For example, the milling time, beam angle, segment length, and incremental milling depth can be varied as desired from milling step to milling step to create a leading taper having a desired surface geometry. The surface geometry can be linear or non-linear. Also, the present invention can be used to form tapered surfaces at locations on the bearing surface of the slider other than the leading edge. In addition, other methods and structures can be used for varying the exposure of the bearing surface to the milling beam to create a tapered surface in alternative embodiments. For example, a movable shield can be mounted within the etching system between the beam source and the bearing surface for varying the area exposed to the milling beam over time.

What is claimed is:

1. An etching system for fabricating a taper in a selected area on a bearing surface of a disc head slider, the etching system comprising:

an etching beam source which generates an anisotropic etching beam;

a resist layer positioned on the bearing surface in a pattern which leaves the selected area uncovered, wherein the resist layer has a thickness and the selected area has a length measured from a base of the resist layer;

a fixture which holds the disc head slider with the bearing surface at a progressively variable angle of incidence relative to the etching beam such that a first portion of the selected area is shaded from the etching beam by the resist layer and a second portion of the selected area is unshaded from the etching beam by the resist layer; and controller means coupled to the fixture for:

defining n segments, $segment_1$–$segment_n$, along the length wherein each $segment_i$ has a segment length $L_i$, n is an integer, i is an integer ranging from 1 to n, and $segment_n$ is closer to the resist layer than $segment_1$;

operating the etching beam source to etch the unshaded second portion and the resist layer in n steps $step_i$, –$step_n$, with each $step_i$ corresponding to a $segment_i$; and controlling the angle of incidence such that, for each $step_i$, the unshaded, second portion, including $segment_1$, and the resist layer are etched at an angle $α_i$ that results in the resist layer shadowing all segments, $segment_{i+1}$ $segment_n$, that are closer to the resist layer than $segment_i$ and results in the resist layer being etched to a remaining thickness, where the angle $α_i$=arctan $((L_{i+1}+L_{i+2}+...+L_n)/(\text{the remaining thickness}))$.

2. The etching system of claim 1 wherein the controller means varies the area of the first portion relative to the second portion progressively over time by progressively varying the orientation of the fixture relative to the etching beam source.

3. The etching system of claim 1 wherein the controller means comprises means for controlling the etching beam source to etch the unshaded, second portion to an incremental depth $D_i$ which is equal to a preselected maximum taper depth D divided by the number of etching steps, n, during each $step_i$.

4. The etching system of claim 3 wherein the controller means comprises means for controlling the etching beam source to etch at an etching rate $R_i$ at the angle $α_i$, for a time interval $t_i$, where $t_i=D_i/R_i$, during each etching $step_i$.

5. An etching system for fabricating a taper in a selected area on a bearing surface of a disc head slider, the etching system comprising:

a resist layer positioned on the bearing surface in a pattern which leaves the selected area uncovered, wherein the resist layer has a thickness and the selected area has a length measured from a base of the resist layer;

a fixture which holds the disc head slider;

an etching beam source which directs an anisotropic etching beam toward the bearing surface, wherein a first portion of the selected area is shaded from the etching beam and a second portion of the selected area is unshaded from the etching beam; and controller means coupled to the fixture for defining a plurality of segments along the length and progressively varying an orientation of the fixture relative to the etching beam source in a plurality of steps such that the area of the first portion varies progressively relative to the area of the second portion, wherein each of the steps corresponds to one of the segments and, for each step, the segments in the unshaded, second portion and the resist layer are etched at an angle that results in the resist layer shadowing all the segments that are closer to the resist layer than the corresponding segment and results in the resist layer being etched to a remaining thickness, and wherein the controller means sets the angle at each step as a function of a distance between the corresponding segment and the resist layer and the remaining thickness of the resist layer.

6. The etching system of claim 6 wherein the controller means comprises means for controlling the etching beam source to etch the unshaded, second portion to an incremental depth $D_i$ which is equal to a preselected maximum taper depth D divided by the number of etching steps, during each $step_i$ of the plurality of steps, where i is an integer variable.

7. The etching system of claim 6 wherein the controller means comprises means for controlling the etching beam source to etch at an etching rate $R_i$ for a time interval $t_i$, where $t_i = D_i/R_i$, during each $step_i$.

* * * * *

UNITED STATES PATENT AND TRADEMARK OFFICE
CERTIFICATE OF CORRECTION

PATENT NO. : 6,264,787 B1
DATED : July 24, 2001
INVENTOR(S) : Burbank

It is certified that error appears in the above-identified patent and that said Letters Patent is hereby corrected as shown below:

Column 4,
Line 19, replace "$=D_iR_i$" with -- $t_i=D_iR_i$ --.

Column 6,
Line 18, single indent only before "controller".
Lines 25-26, replace "steps $step_i$, -$step_n$", with -- steps, $step_1$,-$step_n$ --.
Line 29, replace "$segment_1$" with -- $segment_i$ --.
Line 31, replace "$segment_{i+1}$ $segment_n$" with -- $segment_{i+1}$ - $segment_n$ --.

Signed and Sealed this

Twentieth Day of May, 2003

JAMES E. ROGAN
*Director of the United States Patent and Trademark Office*